July 16, 1940.  S. N. HURT  2,208,555
WEIGHING SCALE
Filed July 1, 1938  3 Sheets-Sheet 1
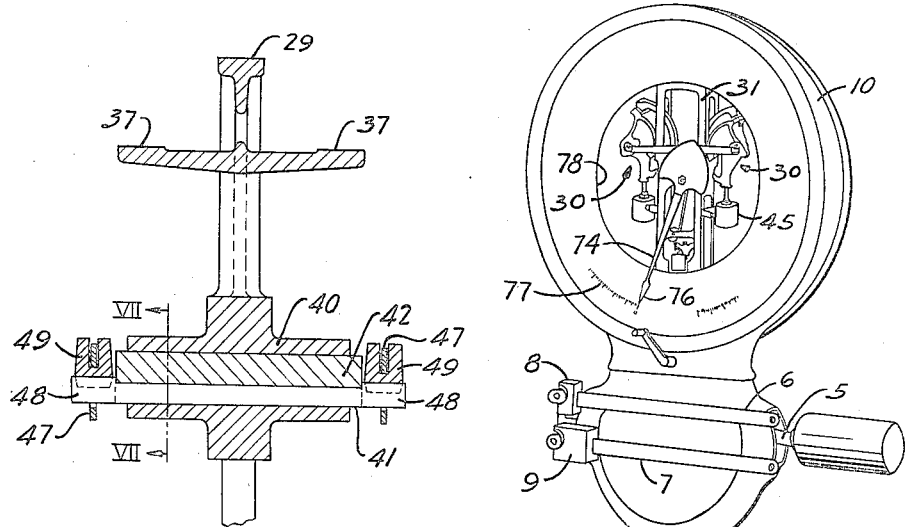
Fig. V
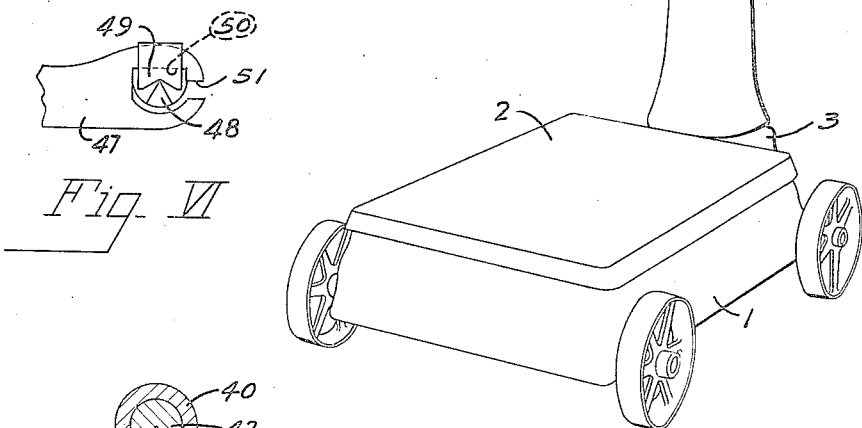
Fig. I
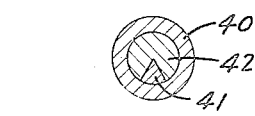
Fig. VI
Fig. VII
Samuel N. Hurt
INVENTOR
BY Marshall & Marshall
ATTORNEYS July 16, 1940.  S. N. HURT  2,208,555
WEIGHING SCALE
Filed July 1, 1938  3 Sheets-Sheet 2.
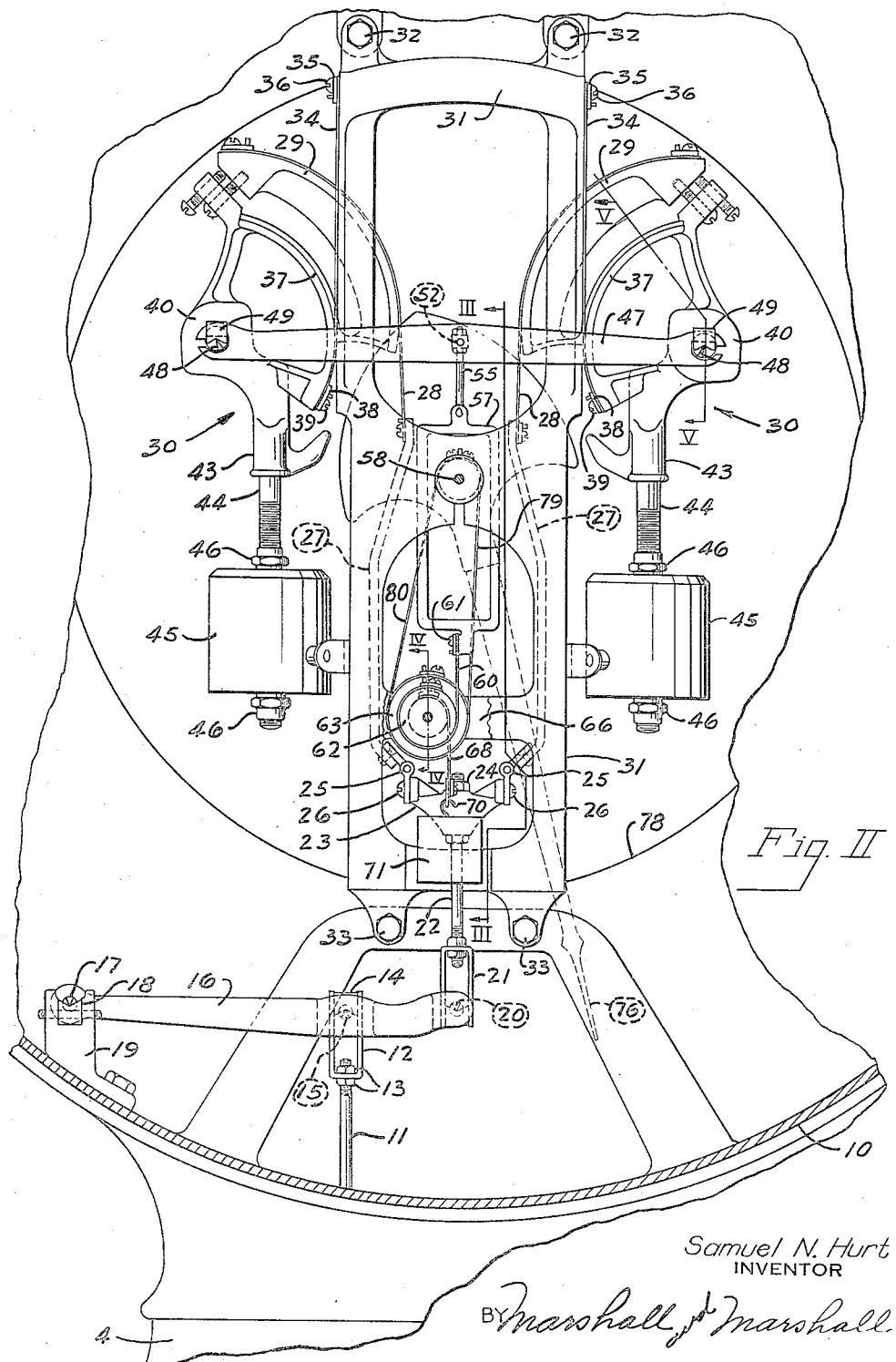
Fig. II
Samuel N. Hurt
INVENTOR
BY Marshall & Marshall
ATTORNEYS July 16, 1940.  S. N. HURT  2,208,555
WEIGHING SCALE
Filed July 1, 1938   3 Sheets-Sheet 3
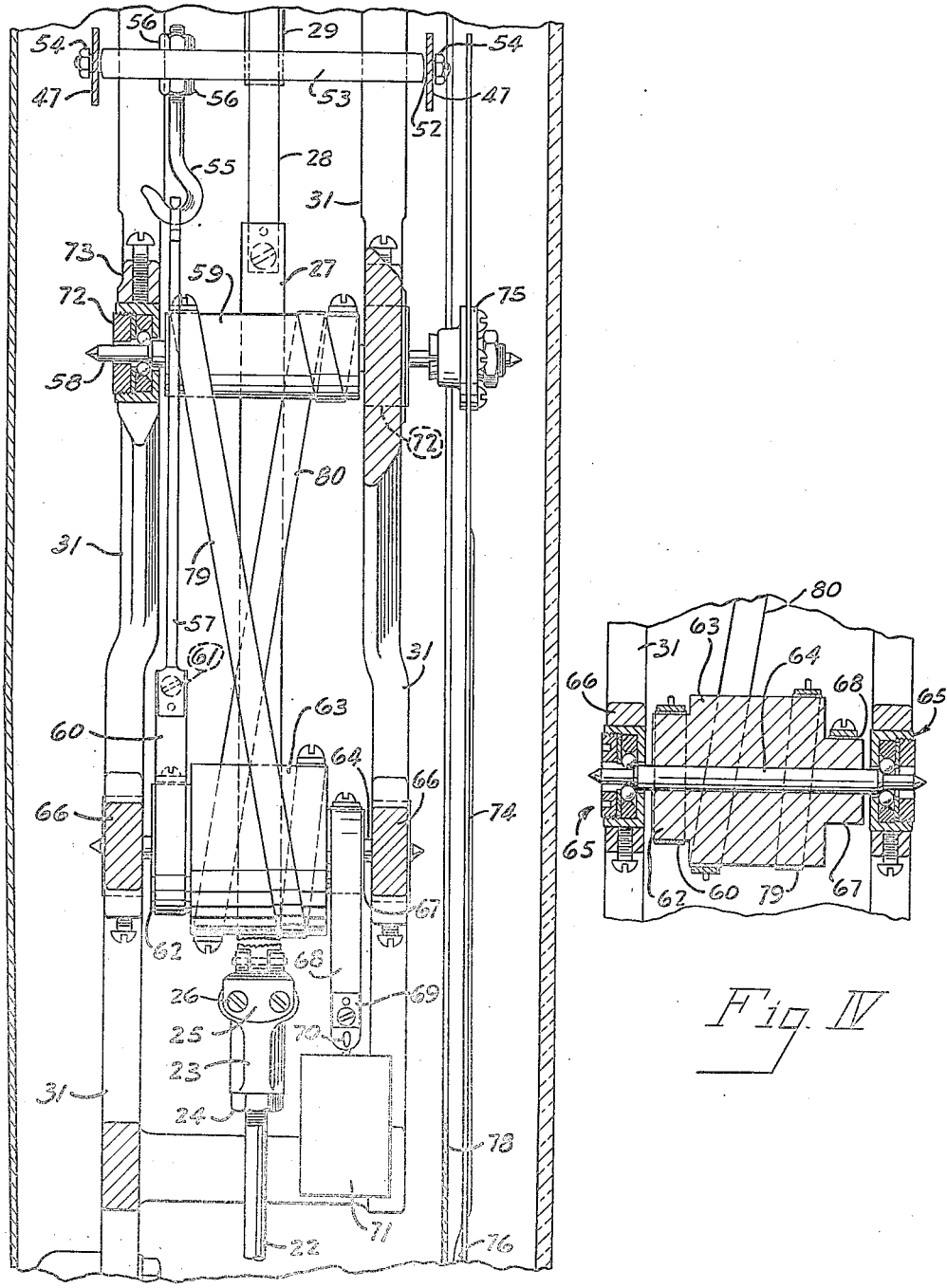
Fig. III  Fig. IV
Samuel N. Hurt
INVENTOR
BY Marshall & Marshall
ATTORNEYS Patented July 16, 1940

2,208,555

UNITED STATES PATENT OFFICE 2,208,555

WEIGHING SCALE

Samuel N. Hurt, Toledo, Ohio, assignor to Toledo Scale Company, a corporation of New Jersey Application July 1, 1938, Serial No. 217,002

6 Claims. (Cl. 265—62)

This invention relates generally to weighing scales, and more particularly to weighing scales having means for automatically indicating the weight, such as, for example, a relatively movable chart and indicator.

The principal object of the invention resides in improved means for transmitting motion to the movable member of the indicator couple.

Another object of the invention is the provision of improved flexible means for actuating a scale indicator member.

Another object is the provision of improved flexible means which have no lost motion for driving an indicator in accordance with the displacement of the automatic counter-balancing system by the applied load.

Still another object is the provision of improved indicator driving means whereby the movement of the indicating member may be greatly amplified.

A still further object is the provision of improved means whereby the normal amplitude of movement of the indicator may be maintained and the oscillating angle of the scale levers reduced; and, A still further object is the provision of an improved, flexible scale indicator drive.

These, and other objects and advantages will be apparent from the following description in which reference is had to the accompanying drawings, illustrating a preferred embodiment of the invention and wherein similar reference numerals refer to similar parts throughout the several views.

In the drawings:

Fig. I is a perspective view of a scale of a type in which the invention may be embodied.

Fig. II is an enlarged, fragmentary view of the load counterbalancing and portions of the load indicating means.

Fig. III is an enlarged, fragmentary view taken substantially along the line III—III of Figure II.

Fig. IV is an enlarged, fragmentary sectional view of the motion multiplying roller, the section being substantially along the line IV—IV of Figure II.

Fig. V is a sectional view through the pendulum substantially along the line V—V of Figure II.

Fig. VI is an enlarged, fragmentary view of one of the ends of the compensating plate and showing in detail the pivotal connection with the pendulums; and, Fig. VII is a sectional view substantially along the line VII—VII of Figure V.

Referring to the drawings in detail:

The scale in which the invention is shown embodied comprises a base 1, which preferably is a rigid iron casting, housing the usual load supporting lever system (not shown). In the well known manner a platform 2 is pivoted on the lever system. A deck portion 3, projecting outwardly at the rear of the base 1, supports a column 4. This column 4 is hollow and in an enlarged portion near its upper end a beam lever 5 is pivotally mounted. Suitable projecting brackets secured to the lever 5 have bolted thereto beams 6 and 7 on which poises 8 and 9 are slidably mounted for the usual purpose. Connections (not shown) extending between the load supporting lever system in the base and the lever 5 are provided to transmit the "pull" resulting from a load on the platform to the load counter-balancing mechanism situated in a substantially watchcase-shaped housing 10, surmounting and bolted to the column 4. A rod 11, which forms the upper terminal member of the connecting means, is secured, by means of nuts 13, to a stirrup 12 which with the aid of a V grooved bearing 14 engages a load pivot 15 in a lever 16. This lever 16 is provided with a pivot 17 extending through one of its ends and which is fulcrumed on a bearing 18 suitably mounted in a bracket 19 bolted in proper position to the inner wall of the housing 10.

A power pivot 20 fixed in the opposite, free end of the lever 16 engages a suitable bearing in a stirrup 21 suspended by means of a rod 22 from a yoke 23. This rod 22 projects through a bore in the yoke and is adjustably secured therein by means of nuts 24 one of which is positioned above the yoke and the other below. Flaps of hinges 25 are fastened by means of screws 26 to outer parallel faces of the yoke 23 and the other flaps of these hinges 25 are fastened by means of rivets to shaped, upwardly extending arms 27. The upper ends of these arms 27 are clamped to the lower ends of flexible metallic ribbons 28 overlying and fastened to arcuate faces of power sectors 29 which are integral portions of rolling fulcra load, counterbalancing pendulums 30.

For the purpose of suspendingly supporting these pendulums 30 a pendulum fulcrum frame 31 is secured by bolts 32 and 3 to properly located bosses in the interior of the housing 10. This fulcrum frame 31 is provided with parallel, machined track faces, and pendulum fulcrum ribbons 34 are clamped by means of clips 35 and screws 36 to the upper ends of these faces. These ribbons 34 overlie and are fastened to the lower ends of arcuate faces of fulcrum sectors 37 by means of clips 38 and screws 39. To obtain greater accuracy and stability these fulcrum sectors 37 of each pendulum are cast integral with the power sector 29 and a hub 40.

For a purpose which will hereinafter be more fully described, a pivot bar 41 is seated in a bore extending transversely through the hub 40 of each of the pendulums 30. This bar is firmly fixed in position by means of a suitable retainer 42. The ends of this bar 41, which project beyond the faces of the hub 40, are milled to form knife edges 48. Studded into downwardly depending projections 43 of the hubs 40 are pendulum stems 44 on which pendulum weights 45 are adjustably threaded. Lock nuts 46, threaded on the stems 44 above and below the weights 45, are provided to securely lock these weights 45 in adjusted position.

For the purpose of operatively connecting the load counterbalancing mechanism comprising the pendulums 30 to the load indicating means and to translate the vertically reciprocal motion of the pendulums into rotary motion of an indicator so-called compensating plates 47 operatively engage the projecting knife edges 48 by means of V grooved bearings 49. The compensating plates 47 are preferably constructed from thin, but stiff, sheet steel and each of the ends of these plates 47 is provided with a substantially D shaped aperture. To permit the bearings 49 to be assembled in the aperture a narrow slot 51 extends between one side of the aperture and the outer end of the bar and is so positioned in relation to the straight side that a small shoulder remains which serves to retain the V bearing 49 which is provided with a milled slot in which the compensating plates are seated. This slot extends at right angles to the V groove of the bearing. Round holes in the compensating plates positioned substantially midway between the V's of the bearings 49 receive cylindrical, trunnion-like ends 52 of a transversely positioned connecting bar 53 having an otherwise square cross section. The extreme ends of these trunnions, which project through the plates, are threaded and provided with nuts 54. These nuts 54 prevent the compensating plates 47 from spreading laterally and the bearings 49 are thus constrained to maintain their positions on the pivots 48. Since the straight side of the D shaped aperture 50 is slightly longer than the width of the V bearing 49 these bearings may shift slightly longitudinally on the plate 47 to accommodate themselves to slight variations in the distance between the knife edges 48 in the two pendulums 30 when the scale is in operation. These variations in the distance between the two mentioned pivots are caused by the compensating action of the pendulums when the scale is tipped slightly out of its level position. These variations are very small but unless compensation is provided friction between the bearings and the pivots will result and cause inaccurate weighing results. Heretofore these compensating plates in scales of the type described were operatively connected to the pendulums by means of horizontally extending cone pivots engaging apertures in the ends of hardened members in the pendulum hubs and since other means were also provided for the compensating for the variation in the pivot distance that construction required a great deal of care in manufacture and they were correspondingly expensive. The knife edge bearing construction heretofore described costs less to manufacture and is an improvement since there is less friction and less wear especially when the scale is installed in a position where it is subjected to vibrations and rough handling.

Since the faces of the power sectors 29 are eccentric to the points about which the pendulums turn the distance between the faces of the two opposed pendulums vary with each different position. For this reason the arms 27, which are suitably formed to clear mechanism later to be described, are secured to the yoke 23 by means of the hinges 25 so that regardless of the position of the power sectors the arms 27 are capable of aligning themselves to the proper angle.

Extending through a drilled hole in the connecting bar 53 and locked therein by means of nuts 56 is a hook 55 which supports the upper end of a rectangular frame 57 which straddles a shaft 58 and a cylindrical member mounted thereon. The lower end of this frame 57 has a perpendicularly disposed face to which the upper end of a flexible metallic ribbon 60 is clamped by means of a clip and screw 61. The other end of this ribbon 60 overlies a periphery of a cylindrical shoulder 62 of a cylindrical member 63 circumjacently mounted on a shaft 64. The ends of this shaft are hardened and ground and are mounted in anti-friction ball bearings 65, positioned in circular apertures in flange-like portions 66 of the frame 31. The cylindrical member 63 is provided with a second cylindrical shoulder 67 on its opposite end (Figures III and IV) and a flexible metallic ribbon 68 is fastened thereto and overlies its periphery, its lower end is provided with a reinforcing clip 69 from which a rectangular counterweight 71, whose function will hereinafter be made clear, is suspended by the cooperation of a hook 70 studded therein.

The shaft 58, hereinbefore referred to, is rotatably mounted in anti-friction ball bearings 72 fixed to side flanges 73 of the frame 31. One end of this shaft 58 extends beyond the face of the ball bearing, a distance sufficient so that an indicator 74 may be clamped thereto by a hub 75. The end of the indicator is formed into an index point 76 and cooperates with a row of said indicia 77 printed on a dial-like chart 78 which is bolted, immediately in back of the indicator, to suitable projections in the interior of the housing 10.

The cylindrical members 59 and 63 are connected by flexible metallic ribbons 79 and 80. The ends of these ribbons 79 and 80 have their ends clamped to the cylindrical members just referred to in such a manner that they are spirally wound and unwound in opposite directions when the scale is in operation. It is essential that care is taken in the assembly of these ribbons so that they have equal tension on the cylindrical members and that they wind and unwind without buckling or kinking.

When a load is placed on the platform 2 its pull is transmitted through suitable intermediate mechanism, and the connecting rod 11 with its stirrup 12, to the lever 16 and through it and the yoke 23, the hinged members 27 and the ribbons 28 to the power sectors 29 of the load counterbalancing pendulums 30. Their fulcrum sectors 37, in the known manner, roll upwardly on the ribbons 34, the pendulum weights 45 swing outwardly until their weight moments counterbalance the weight moment of the load on the platform. As the pendulums move upwardly the compensating plates 47, which with their bearings 49 rest on the pivots 48, partake of this movement and a pull is exerted through the frame 57 on the ribbon 60. The end of this ribbon 60 is pulled upwardly, unwinding from the cylindrical shoulder 62 and turning the cylindrical member 63 about its axis in an anticlockwise direction (see Fig. II). This turning movement winds up the lower end of the spirally wound ribbon 80 thus rotating the cylindrical member 59 and the shaft 58 upon which it is mounted and since the indicator 74 is clamped thereto it is rotated through an angle which is proportionate to the weight of the load on the platform and its index point 76 points to the proper indicium in the series 77 on the chart 78.

When the load is removed from the platform the pull on the pendulum becomes zero and these roll downwardly on their fulcrum sectors 37 releasing the pull on the ribbon 80. The weight 71, which is suspended by the ribbon 68 from the periphery of the cylindrical shoulder 67 of the member 63, exerts a downwardly directed force and through the spirally wound ribbon 79 causes the indicator 74 to return to the zero indicium. Since the weight 71 always exerts a constant force in one direction any possible lost motion in the system is obviated.

It should now be apparent that an indicator driving mechanism which embodies the invention is a desirable feature in scales of the type described. These scales of the type described are built in various capacities, each capacity requiring individual pendulum weights and in some instances individual fulcrum and power sectors. When a driving mechanism embodying the instant invention is used, by varying the diameters of the cylindrical shoulders and the diameter of the cylindrical members, the same pendulum weights, fulcrum and power sectors may be used for more than one capacity since a smaller angular movement of the pendulum caused by a lighter load may be conveniently multiplied by the cylindrical members and the flexible ribbons so that the indicator will make a complete revolution.

It is also desirable at times to multiply the indicator movement so that it will make two or more revolutions for the scale capacity to increase the distance between the weight graduations which are then shown on two or more series of indicia on the chart.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, weighing mechanism comprising load receiving means, load counterbalancing mechanism and load indicating means, said load counterbalancing mechanism including a pair of oppositely acting pendulums having vertical reciprocating motion, compensating plates pivotally connected to said pendulums and partaking of their vertical motion, said indicating means comprising a plurality of rotatable cylindrical members, at least one of said plurality of cylindrical members having portions of different diameters, a weight indicator fixedly secured to the other of said cylindrical members, means including a metallic ribbon extending between said compensating plates and said cylindrical member having said different diameter portions, other ribbons extending between said last mentioned cylindrical member and said cylindrical member having said indicator fixedly secured thereto and a counterweight suspended from a portion of said cylindrical member having said portions of different diameter by means of a flexible metallic ribbon.

2. In a device of the class described, in combination, weighing mechanism comprising load receiving means, load counterbalancing mechanism and load indicating means, said load counterbalancing mechanism including a pair of oppositely acting pendulums having vertical reciprocating motion, compensating plates pivotally connected to said pendulums and partaking of their vertical motion; said indicating means comprising a plurality of pivotally mounted cylindrical members, a weight indicator fixedly secured to one of said cylindrical members, a plurality of flexible metallic ribbons extending between said compensating plates and said cylindrical member having said indicator attached thereto, some of said plurality of metallic ribbons having their opposite ends attached to each of said cylindrical members and adapted to be wound spirally thereon, another of said plurality of flexible members being operatively connected to said compensating plates and another ribbon being attached to that cylindrical member not having said indicator fixedly secured thereto and to a freely suspended counterweight.

3. In a device of the class described, in combination, weighing mechanism comprising load receiving means, load counterbalancing mechanism and load indicating means, said load counterbalancing mechanism including a pair of oppositely acting pendulums having vertical reciprocating motion, compensating plates pivotally connected to said pendulums and partaking of their vertical motion; said indicating means comprising a plurality of pivotally mounted cylindrical members, a weight indicator fixedly secured to one of said cylindrical members, a plurality of flexible metallic ribbons spirally wound on opposite sides of said cylindrical members and connecting means including a frame extending beteween one of said cylindrical members and said compensating bars.

4. In a device of the class described, in combination, weighing mechanism comprising load receiving means, load counterbalancing mechanism and load indicating means, said load counterbalancing mechanism including a pair of oppositely acting pendulums having vertical reciprocating motion, compensating plates pivotally connected to said pendulums and partaking of their vertical motion, said indicating means comprising a plurality of pivotally mounted cylindrical members, a weight indicator fixedly secured to one of said cylindrical members and flexible means extending between said compensating plates and said cylindrical member having said indicator secured thereto for rotating said indicator.

5. In a weighing scale, in combination, load receiving means, load counterbalancing mechanism and load indicating means in cooperative relation, said load counterbalancing mechanism comprising a pair of parallelly mounted pendulums, each of said pendulums having an eccentric face, said indicating means including members stationed below the horizontal plane in which said pendulums are fulcrumed and on vertical planes between said arcuate faces, a connection between said load receiving means and said arcuate faces of said pendulums and said connection including bowed, hinged nonflexible members formed to clear said members of said indicating means stationed below and between said pendulums.

6. In a weighing scale, in combination, load receiving means, load counterbalancing mechanism and load indicating means, said load counterbalancing mechanism including a pair of flexibly suspended oppositely acting pendulums having a reciprocating vertical motion, each of said pendulums having knife edges extending on their centers of revolution and rigid compensating plates having self adjustable bearings engaging said knife edges and connecting said pendulums, a rotatable weight indicator and connecting means extending from said compensating plates at a point substantially midway between said pivots in said pendulums, and said indicator, said connecting means including a plurality of cooperating pivotally mounted cylindrical members and a plurality of flexible metallic ribbons.

SAMUEL N. HURT.